US007090372B2

(12) United States Patent
Liao et al.

(10) Patent No.: US 7,090,372 B2
(45) Date of Patent: Aug. 15, 2006

(54) GENERATOR-DRIVEN LIGHTING DEVICE FOR HAND-HELD POWER TOOL

(75) Inventors: Jung-Huang Liao, Hsinchu (TW); Yuh-Ren Lee, Chupei (TW)

(73) Assignee: Industrial Technology Research Institute, Hsinchu (TW)

(*) Notice: Subject to any disclaimer, the term of this patent is extended or adjusted under 35 U.S.C. 154(b) by 63 days.

(21) Appl. No.: 10/900,675

(22) Filed: Jul. 27, 2004

(65) Prior Publication Data

US 2005/0276041 A1 Dec. 15, 2005

(30) Foreign Application Priority Data

Jun. 9, 2004 (TW) ............................... 93116493 A

(51) Int. Cl.

*B60Q 1/00* (2006.01)
*H01J 17/34* (2006.01)
*B25B 23/18* (2006.01)
*H02K 7/14* (2006.01)

(52) U.S. Cl. ........................ 362/192; 362/119; 315/55; 310/47; 310/50

(58) Field of Classification Search ................ 362/192, 362/193, 109, 119, 183; 310/47, 50; 173/46, 173/171; 315/55, 76

See application file for complete search history.

(56) References Cited

U.S. PATENT DOCUMENTS

| | | | | |
|---|---|---|---|---|
| 5,165,776 | A * | 11/1992 | Long-Jen | 362/473 |
| 5,982,059 | A * | 11/1999 | Anderson | 310/50 |
| 6,713,905 | B1 * | 3/2004 | Hirschburger et al. | 310/47 |
| 6,906,466 | B1 * | 6/2005 | Feng | 315/55 |
| 2002/0136021 | A1 * | 9/2002 | Hung | 362/500 |
| 2004/0171299 | A1 * | 9/2004 | Zeiler et al. | 439/577 |

* cited by examiner

*Primary Examiner*—Renee Luebke
*Assistant Examiner*—Evan Dzierzynski
(74) *Attorney, Agent, or Firm*—Pro-Techtor Int'l Services

(57) ABSTRACT

A generator-driven lighting device for a hand-held power tool has a lighting device, mounted on said main body of said power tool; an electric generator assembly, mounted on said power tool, supplying said lighting device with power; and a transmission device, connecting a generator axis of said generator and a main axis of said power tool, which thereby drives a rotational movement of said generator, causing said generator to generate electric power; wherein by said power tool mechanically driving said generator, said lighting device provides lighting for a user operating said power tool.

6 Claims, 4 Drawing Sheets

GENERATOR-DRIVEN LIGHTING DEVICE FOR HAND-HELD POWER TOOL

BACKGROUND OF THE INVENTION

1. Field of the Invention

The present invention relates to a generator-driven lighting device for a hand-held power tool, particularly to a generator-driven lighting device for a hand-held pneumatic or hydraulic power tool which has an integrated electric power generator to drive an LED lighting source.

2. Description of Related Art

Maintaining of cars and machines regularly requires working with hand-held pneumatic or hydraulic power tools, like screwdrivers or drills, in confined space. Under these conditions, room lighting usually does not provide sufficient lighting, so portable lamps have to be used. However, since both hands are often needed to hold a tool, a portable lamp has to be carried by another person or attached to the tool, with the position thereof constantly being adjusted, which is inconvenient. Furthermore, any movement during work is made cumbersome and even risky by having to carry along a lamp.

Therefore, tools with integrated lamps have appeared on the market to provide sufficient and convenient lighting for work. Conventional lamps that are integrated into tools are usually powered by batteries. Batteries, however, need to be replaced after certain time periods, making use thereof inconvenient.

Furthermore, power tools with integrated electric generators for supplying power to in-built lamps have been brought to the market, as for example disclosed in U.S. Pat. No. 5,982,059 "Electric generator and Lighting Assembly". These devices do not need batteries to produce electricity. However, these conventional devices each use a rotor that is directly set on a main rotational axis of the tool, so that a special design is required, making power tools more complicated and hard to assemble.

SUMMARY OF THE INVENTION

It is the main object of the present invention to provide a generator-driven lighting device for a hand-held power tool which provides lighting for a user operating the power tool.

Another object of the present invention is to provide a generator-driven lighting device for a hand-held power tool which has an integrated electric generator driven by a main axis of the power tool and supplying power for the lighting.

The present invention has a lighting device and an electric generator assembly, connected with the power tool via a transmission device, which is a set of gears or a flexible assembly, so that the power tool drives the electric generator assembly to produce electricity.

By the assembly of above parts, the present invention achieves the object of generating lighting for work without the need of a battery, with gears or a flexible axis providing a direct connection between the generator and the main axis of the power tool, resulting in a simplified design and lower cost.

The present invention can be more fully understood by reference to the following description and accompanying drawings.

DETAILED DESCRIPTION OF THE PREFERRED EMBODIMENTS

As shown in FIG. 1, the generator-driven lighting device for a hand-held power tool of the present invention comprises: a lighting device 10, mounted on a fluid-driven, such as pneumatic or hydraulic, power tool 20 at a certain position, providing lighting for working with the power tool 20; an electric generator assembly 30, mounted on the power tool 20 and having a generator 31 which is driven by the power tool 20 and generates electricity for the lighting device 10; a transmission device 40, connecting the generator 31 and a main drive shaft 21 of the power tool 20, which thereby drives the generator 31; and a housing 70, covering the power tool 20, the electric generator assembly 30 and the transmission device 40, avoiding exposure of an outer side of the dower tool 20 as well as inadvertent contact of a user with the electric generator assembly 30 and the transmission device 40. The housing 70 is molded and allows the housing 70 to be opened for maintenance and replacing structural parts.

Referring again to FIG. 1, the lighting device 10 has at least one lighting element 11, via a cable 12 connected with the electric generator assembly 30, so that power is supplied. Preferably, the lighting element 11 is a light-emitting diode (LED) to save energy and avoid high temperature. Of course, a conventional light bulb is applicable, as well.

The generator 31 of the electric generator assembly 30 is a small electric generator mounted in a main body of the power tool 20 and having a rotor and a stator (not shown) By a rotational movement of the rotor and the stator relative to each other, an electric current is generated. The generator 31 has a generator axis 32, which extends from the rotor beyond a case of the generator 31 and is connected with the transmission device 40 to be driven thereby. A capacitor 33 is inserted between the generator 31 and the lighting device 10, storing electricity generated by the generator 31 and supplying the lighting device 10 while being discharged slowly. Thus supply of power to the lighting device 10 is not interrupted when the power tool 20 is not operating.

The transmission device 40 allows to preset a rotational speed of the generator axis 32 for the rotational movement of the rotor and the stator relative to each other generating an electric current. As shown in FIG. 1, the transmission device 40 comprises a primary gear 41, mounted on the main drive shaft 21 of the power tool 20 and driven by the main drive shaft 21, and at least one secondary gear 42, mounted on the generator axis 32 and driving the generator axis 32 which is parallel to and laterally offset from the main drive shaft 21 of the power tool 20.

Referring to FIG. 2, the primary and secondary gears 41, 42 mutually engage, so that the secondary gear 42 is driven by the primary gear 41. Thus rotational speeds and torques of the main axis 21 and the generator axis are not necessarily equal, but are adjustable by varying relative sizes of the primary and secondary gears 41, 42, adapting to practical requirements.

By assembling above structural parts, the electric generator 30 is driven by the main axis 21 of the power tool 20, with the generator 31 supplying electricity for the lighting device 10. Therefore, a battery is not required, and convenient lighting for working is achieved. Furthermore, by employing the transmission device 40, the generator 31 is not set on the main axis 21 of the power tool 20, allowing for easy adapting of rotational speed and torque of the generator 31 to practical requirements at minimal cost.

Referring to FIGS. 3 and 4, the present invention in a second embodiment has a transmission device 50, comprising a primary wheel 51, mounted on the main axis 21 of the power tool 20, a secondary wheel 52, mounted on the generator axis 31, and a conveyor belt 53, connecting the primary and secondary wheels 51, 52. A chain is substitutable for the conveyor belt 53 with similar effect.

The transmission device 50 allows for adjusting of ratios of rotational speeds, so that flexible adaption to practical requirements is possible.

Referring to FIG. 5, the present invention in a third embodiment has an additional battery 60 at the electric generator 30. Thus power is supplied to the lighting device 10 either by the battery 60 alone or by the battery 60 in combination with the electric generator 30. The battery 60 is rechargeable, being recharged by the generator 31.

While the invention has been described with reference to preferred embodiments thereof, it is to be understood that modifications or variations may be easily made without departing from the spirit of this invention which is defined by the appended claims.

Figure 1:
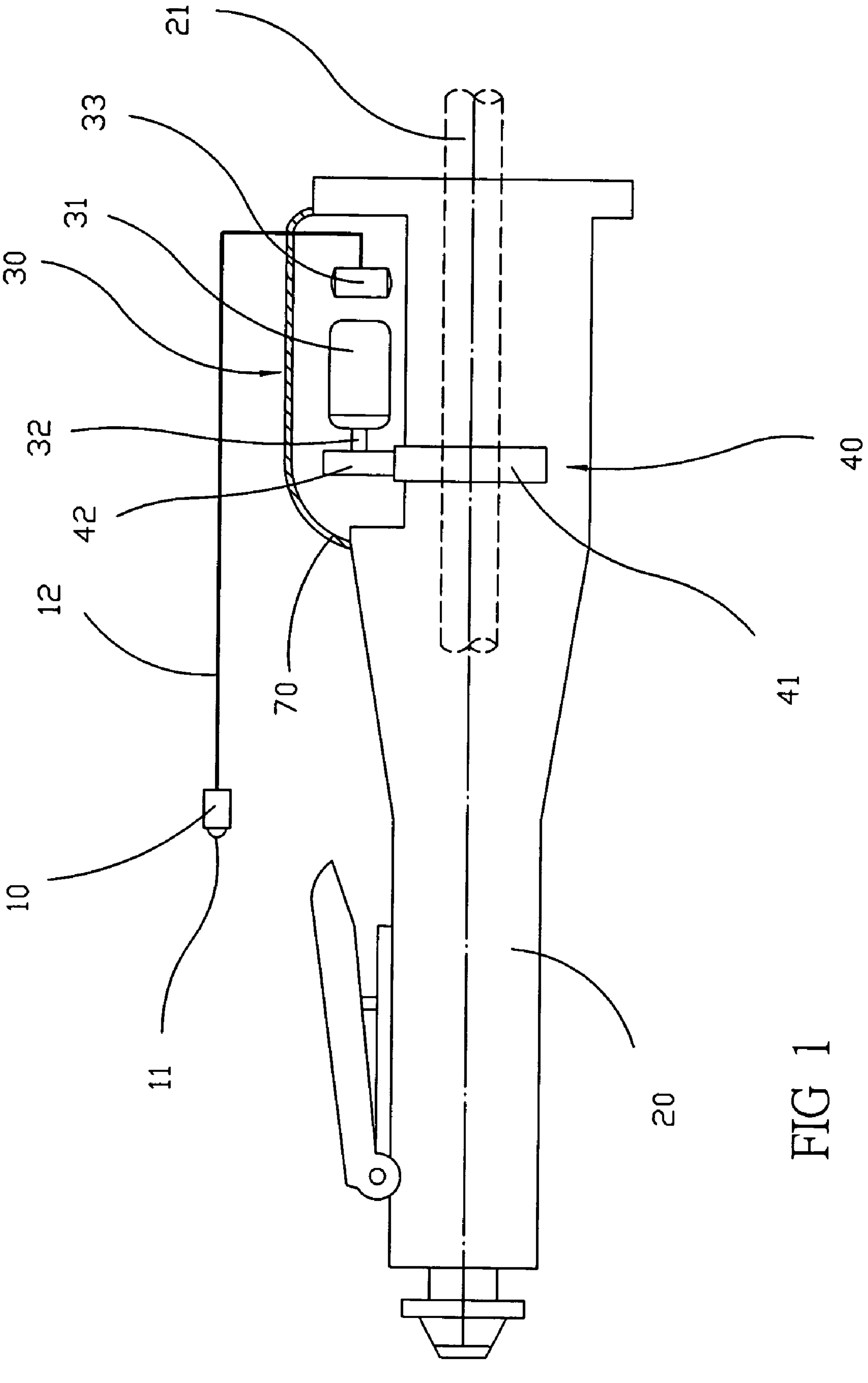
FIG. 1 is a side view of the generator-driven lighting device for a hand-held power tool of the present invention in the first embodiment.
Figure 4:
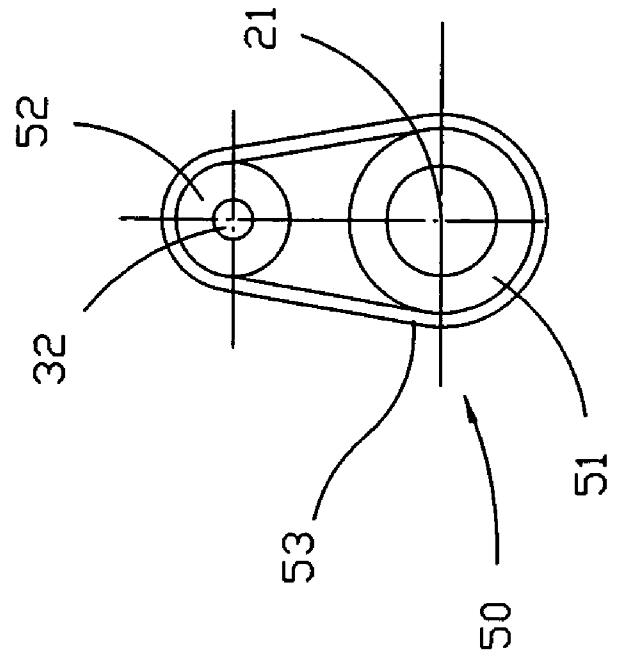
FIG. 4 is a front view of the transmission device of the present invention in the second embodiment.
Figure 2:
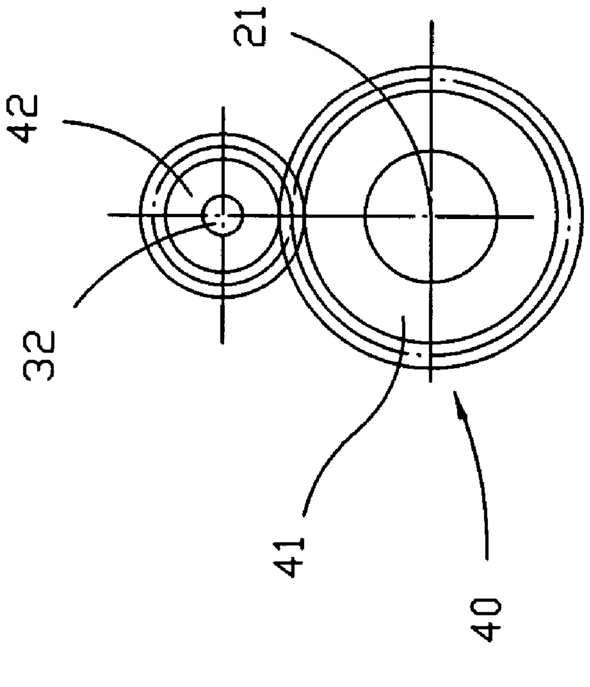
FIG. 2 is a front view of the transmission device of the present invention in the first embodiment.
Figure 3:
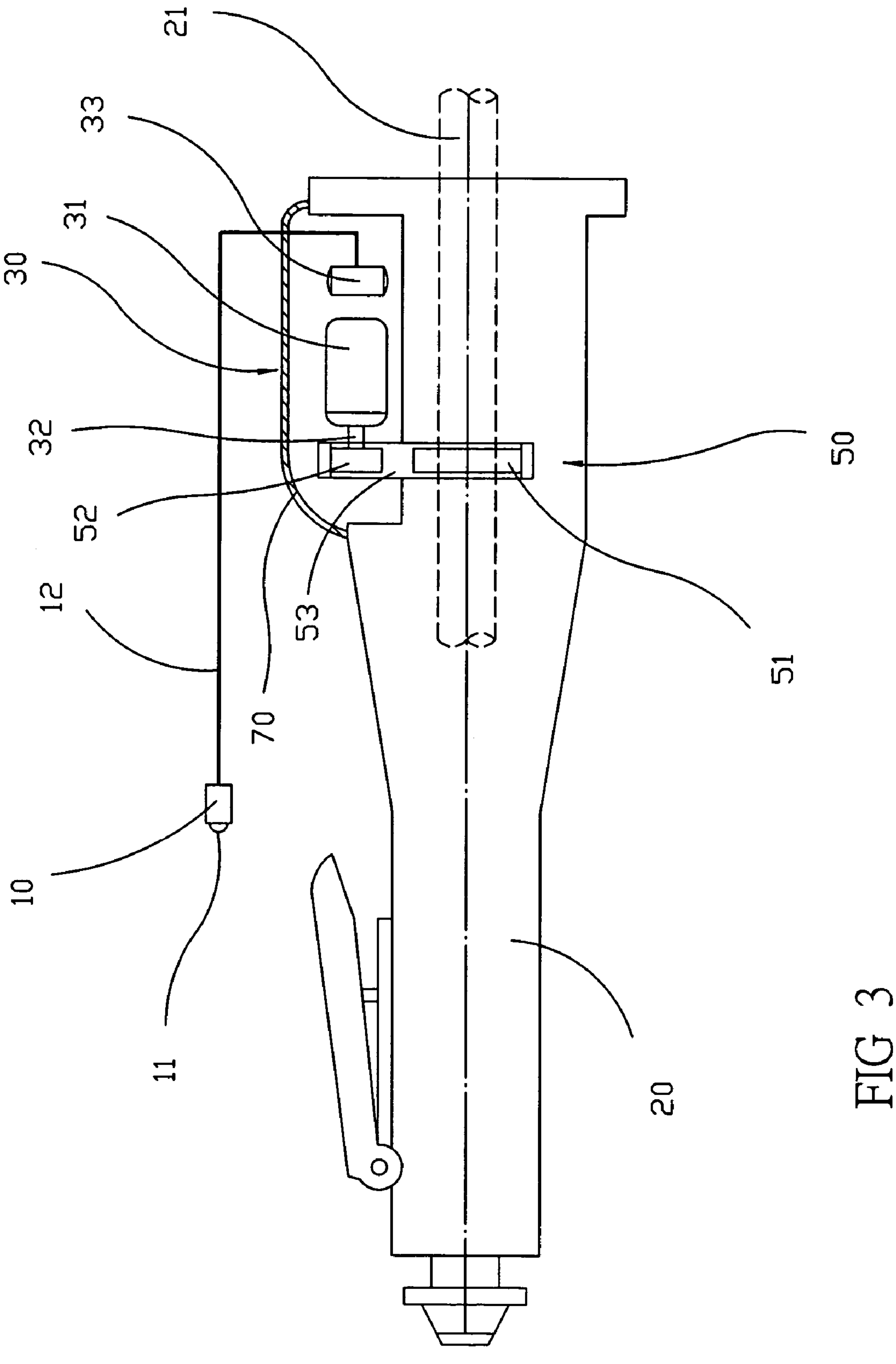
FIG. 3 is a side view of the generator-driven lighting device for a hand-held power tool of the present invention in the second embodiment.
Figure 5:
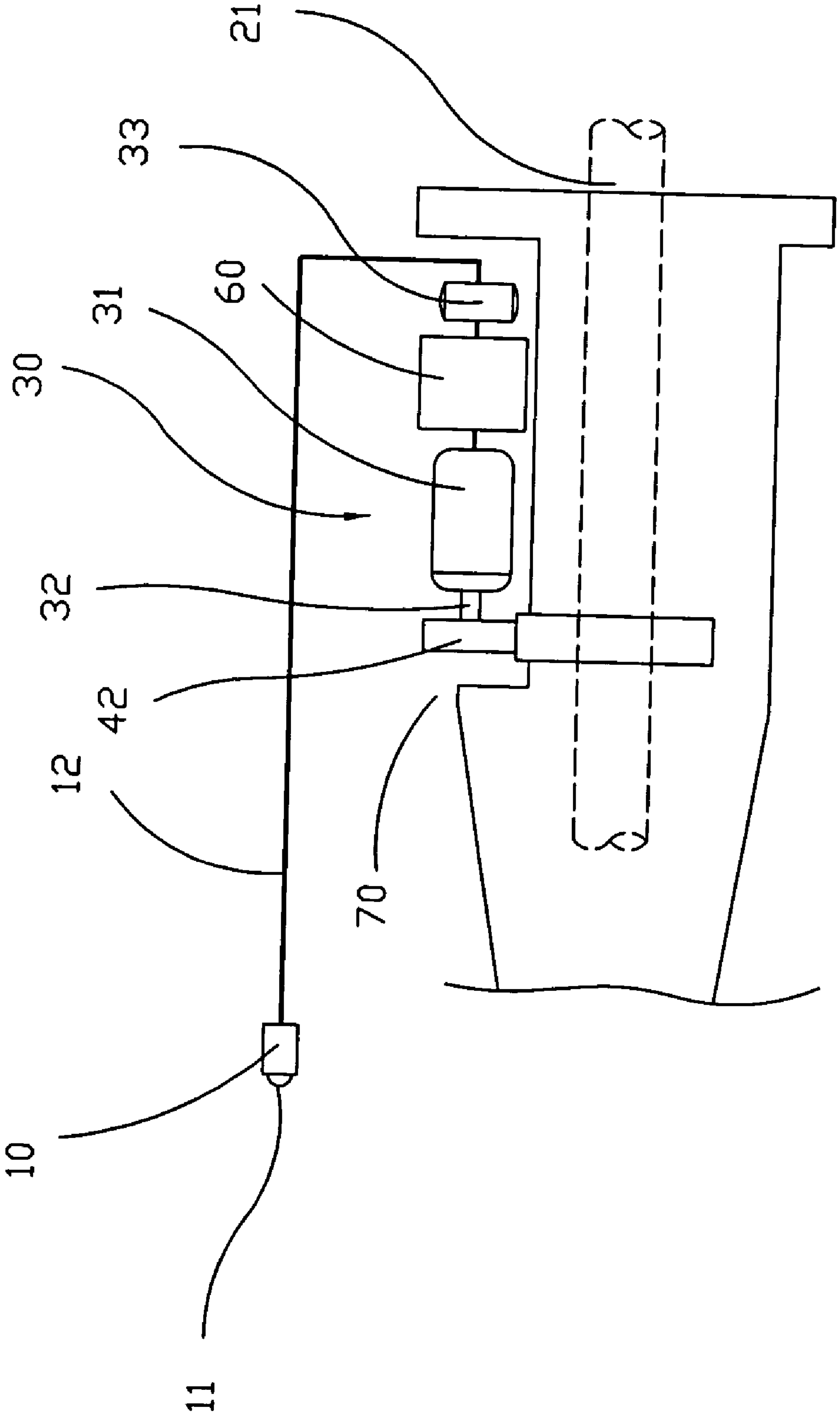
FIG. 5 is a side view of the generator-driven lighting device for a hand-held power tool of the present invention in the third embodiment.

The invention claimed is:

1. A generator-driven lighting device, operating in conjunction with a hand-held power tool with a main body, providing lighting for said power tool, comprising:

a fluid-driven power tool having a main body with a housing, and a main drive shaft;

a lighting device, mounted on said main body of said power tool;

an electric generator assembly, mounted within said housing of said power tool, further comprising an electrical connection to said lighting device, and a generator having a generator axis parallel to and laterally offset from said main drive shaft of said power tool; and a transmission device, laterally transmitting power between said generator axis of said generator and said main drive shaft of said power tool, which thereby drives a rotational movement of said generator axis, causing said generator to generate electric power;

wherein said generator provides electrical power to, said lighting devices, which provides lighting for a user operating said power tool.

2. The generator-driven lighting device according to claim 1, wherein said electric generator assembly has a housing which is molded and allows said housing to be opened for maintenance and replacement of structural parts.

3. A generator-driven lighting device, operating in conjunction with a hand-held power tool with a main body, providing lighting for said power tool, comprising:

a lighting device, mounted on said main body of said power tool;

an electric generator assembly, mounted on said power tool, supplying said lighting device with power and having a generator; and a transmission device, connecting a generator axis of said generator and a main drive shaft of said power tool, which thereby drives a rotational movement of said generator, causing said generator to generate electric power;

whereby said power tool mechanically drives said generator, and said lighting device provides lighting for a user operating said power tool;

wherein said transmission device further comprises a primary gear, mounted on said main drive shaft of said power tool, and a secondary gear, engaging with said primary gear and mounted on said generator axis, so that said rotational movement of said generator is driven by said main drive shaft of said power tool.

4. The generator-driven lighting device according to claim 3, wherein said transmission device further comprises a connecting element, connecting said primary and secondary gears, so that said rotational movement of said generator is driven by said main drive shaft of said power tool.

5. The generator-driven lighting device according to claim 4, wherein said connecting element is a conveyor belt.

6. The generator-driven lighting device according to claim 4, wherein said connecting element is a chain.

* * * * *